Patented Jan. 28, 1947

2,415,017

UNITED STATES PATENT OFFICE 2,415,017

TEXTILE TREATING COMPOUNDS CONTAINING SILICON AND THE PROCESS OF MAKING SAME

Charles A. MacKenzie, Upper Montclair, N. J., assignor to Montclair Research Corporation, a corporation of New Jersey No Drawing. Application February 11, 1944, Serial No. 521,966

8 Claims. (Cl. 260—295)

This invention relates to the production of new quaternary ammonium compounds suitable for rendering textile fibers water-repelling, soft and capable of fixing dyestuffs. The new compounds are made by the simultaneous reaction of a nitrogen compound such as a long chain fatty amide, imide, amidine, diamide, substituted amide, hydrazine, hydroxamic acid and the like with formaldehyde and a silicon halide. This reaction product is then reacted with a tertiary amine to produce what are presumably quaternary ammonium compounds.

An object of the present invention is to provide readily dispersible materials which when applied to textile films may be thereafter decomposed on the fiber to render them water-repellent, receptive to dyestuff and possessing a soft hand.

It is an object of this invention to provide a method of making, in good yield with little or no contaminant, textile treating compounds in a single reaction vessel without the necessity of purifying the intermediates before continuing the reaction.

It is an object of this invention to provide water-repellent materials containing silica in such a form that it will contribute to the fastness and degree of water-repellency in the fabric.

Still further objects and advantages of the present invention will appear from the more detailed description set forth below, it being understood that this more detailed description is given by way of illustration and explanation only, and not by way of limitation, since various changes therein may be made by those skilled in the art without departing from the scope and spirit of the present invention.

In the process of the present invention I use an N-acyl-substituted nitrogen compound which contains from 12 to 30 carbon atoms in each acyl group and at least one hydrogen atom attached to nitrogen. That is, I may employ amides such as stearamide, palmitamide, montanic acid amide, lauramide, or imides such as distearamide, dilauramide, dipalmitamide. I may also use substituted acyl ureas or thioureas such as stearoylurea, stearoylthiourea, palmitoylurea, lauroylurea, and the like, or substituted acyl guanidines, biguanides, dicyandiamides and the like. I may also use N-substituted amides such as N-ethyl stearamide, N-methylene distearamide, or materials such as acyl melamine or long chain-substituted guanamines and the like, or long chain hydroxamic acids.

In the process of the present invention I prefer to use silicon tetrachloride, although I may also use silicon tetrabromide, and silicon tetraiodide, as well as disilicon hexachloride, disiliconoxyhexachloride, polysilicon polyhalide, polysiliconoxypolyhalide, and the like. It is preferable to employ formaldehyde in the process of the present invention in any of its anhydrous forms such as formaldehyde gas, paraformaldehyde, trioxane and the like.

In the process of this invention, as the tertiary amine, I prefer to use pyridine, the picolines, the lutidines, quinoline, substituted quinoline, tri-(alkoxymethyl)amine, trimethyl amine, tetramethyl methylene diamine and the like.

The products of the present invention may be used in water solution, or in organic solvent solution to impregnate textile materials. The textiles are thereafter dried and subjected to high temperature treatment, i. e., over 100° C. In this manner the products of this invention are fixed on the fabric and are substantially resistant to laundering and dry-cleaning.

The following example is given to illustrate the products and process of the present invention. All proportions are in part by weight.

Twenty-eight and three-tenths parts of stearamide, 8.5 parts of silicon tetrachloride, and 6 parts of paraformaldehyde were heated together in 100 parts of dioxan (or other inert solvent miscible with water) for 2 hours with stirring at 90° C. The temperature was maintained at 90° C. and 18.2 parts of pyridine were slowly added over a period of 15 minutes. When cooled a thick paste was obtained which was completely soluble in water to form a strongly foaming solution.

A 5% solution of the above paste was made in water containing 1½% of sodium acetate. O. D. poplin was impregnated with the solution, squeezed, dried at room temperature and heated at 160° C. for 3 minutes. The fabric was rinsed in a weak soap solution, then in water and dried. An initial spray rating of 100 was observed. After three standard dry cleanings, the spray rating was found to be 80–90. After three standard launderings, the spray rating was found to be 80–90.

I claim:

1. A water-soluble, silicon-containing compound capable of rendering textile fibers water-repellent when deposited and decomposed by heat thereon, which is the product of reaction at about 90° C. of a tertiary amine with a reaction product of a mixture of formaldehyde, a silicon halide, and a fatty acid amide which contains from 12 to 30 carbon atoms.

2. A water-soluble, silicon-containing compound capable of rendering textile fibers water-repellent when deposited and decomposed by heat thereon, which is the product of reaction at about 90° C. of a tertiary amine with a reaction product of formaldehyde, silicon tetrachloride and a fatty acid amide which contains from 12 to 30 carbon-atoms.

3. A water-soluble, silicon-containing compound capable of rendering textile fibers water-repellent when deposited and decomposed by heat thereon, which is the product of reaction at about 90° C. of a tertiary amine with the reaction product of a mixture of formaldehyde, silicon tetrachloride and stearamide.

4. A water-soluble, silicon-containing compound capable of rendering textile fibers water-repellent when deposited and decomposed by heat thereon, which is the product of reaction at about 90° C. of pyridine with the reaction product of a mixture of formaldehyde, silicon tetrachloride and stearamide.

5. The process of making a water-soluble, silicon-containing compound which is capable of rendering textile fibers water-repellent when deposited and decomposed by heat thereon, which comprises heating at about 90° C. until reacted a mixture of formaldehyde, a silicon halide and a fatty acid amide which contains from 12 to 30 carbon-atoms, and heating the intermediate reaction product thus formed at about 90° C. with a tertiary amine until a water-soluble compound is formed.

6. The process of making a water-soluble, silicon-containing compound which is capable of rendering textile fibers water-repellent when deposited and decomposed by heat thereon, which comprises heating at about 90° C., until reacted, a mixture of formaldehyde, silicon tetrachloride and a fatty acid amide which contains from 12 to 30 carbon atoms, and thereafter heating the reaction product thus formed at about 90° C. with a tertiary amine until a water-soluble compound is formed.

7. The process of making a water-soluble, silicon-containing compound which is capable of rendering textile fibers water-repellent when deposited and decomposed by heat thereon, which comprises heating at reaction temperature of about 90° C. a mixture of formaldehyde, silicon tetrachloride and stearamide, and thereafter heating the reaction product thus formed at about 90° C. with a tertiary amine until a water-soluble compound is formed.

8. The process which comprises heating at reaction temperature of about 90° C. a mixture of formaldehyde, silicon tetrachloride and stearamide and thereafter heating the reaction product thus obtained at about 90° C. with pyridine until a water-soluble compound is formed.

CHARLES A. MacKENZIE.